US010692232B2

(12) United States Patent
Imai et al.

(10) Patent No.: US 10,692,232 B2
(45) Date of Patent: Jun. 23, 2020

(54) SHAPE RECONSTRUCTION OF SPECULAR AND/OR DIFFUSE OBJECTS USING MULTIPLE LAYERS OF MOVABLE SHEETS

(71) Applicant: CANON KABUSHIKI KAISHA, Tokyo (JP)

(72) Inventors: Francisco Imai, Mountain View, CA (US); Mahdi Nezamabadi, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 15/836,757

(22) Filed: Dec. 8, 2017

(65) Prior Publication Data

US 2018/0189968 A1 Jul. 5, 2018

Related U.S. Application Data

(60) Provisional application No. 62/440,979, filed on Dec. 30, 2016.

(51) Int. Cl.
*H04N 7/18* (2006.01)
*G06T 7/521* (2017.01)
(Continued)

(52) U.S. Cl.
CPC .............. *G06T 7/521* (2017.01); *G01B 11/24* (2013.01); *G01B 11/2522* (2013.01);
(Continued)

(58) Field of Classification Search
CPC ...................................................... G06T 7/521
(Continued)

(56) References Cited

U.S. PATENT DOCUMENTS 8,502,816 B2 * 8/2013 Butler .................... G06F 3/041
345/419
2003/0067462 A1 * 4/2003 Fujiwara ................. G06T 7/596
345/420
(Continued)

OTHER PUBLICATIONS

Laurentini, A., "The visual hull concept for silhouette-based image understanding", Pattern Analysis and Machine Intelligence (IEEE Transactions on), vol. 16, No. 2, pp. 150-162 (1994).
(Continued)

*Primary Examiner* — Leron Beck
(74) *Attorney, Agent, or Firm* — Venable LLP

(57) ABSTRACT

Shape reconstruction of physical objects using structured light patterns and multiple layers of movable sheets which each include a transparent region and a pattern region. Shape reconstruction of specular regions on the surface of the object may proceed by a first phase in which a first sheet is moved to the pattern region and all other sheets are moved to the transparent region, and a first sequence of images is captured for patterns projected on the pattern region of the first sheet; and by a second phase in which the first sheet is moved to the transparent region and all other sheets are moved to the pattern region, and a second sequence of images is captured for patterns projected on the pattern region of the second sheet. Based on the captured images, the shape of the surface of an object, particularly objects having a mirror-like or specular surface having at least some specular characteristics, is reconstructed.

7 Claims, 13 Drawing Sheets

(51) Int. Cl.
  *G06T 15/06* (2011.01)
  *G01B 11/24* (2006.01)
  *G06T 17/00* (2006.01)
  *G06T 15/04* (2011.01)
  *G01B 11/25* (2006.01)
  *G02B 5/02* (2006.01)

(52) U.S. Cl.
  CPC .......... *G01B 11/2536* (2013.01); *G06T 15/04* (2013.01); *G06T 15/06* (2013.01); *G06T 17/00* (2013.01); *G02B 5/0278* (2013.01); *G06T 2207/10004* (2013.01); *G06T 2207/30108* (2013.01); *G06T 2215/16* (2013.01)

(58) Field of Classification Search
  USPC ....................................................... 348/127
  See application file for complete search history.

(56) References Cited

U.S. PATENT DOCUMENTS

| | | | | |
|---|---|---|---|---|
| 2008/0157412 A1* | 7/2008 | Kihara | ................. | B33Y 30/00 264/1.1 |
| 2009/0154794 A1* | 6/2009 | Kim | ................. | G06T 15/205 382/154 |
| 2010/0098323 A1* | 4/2010 | Agrawal | ................. | G01B 11/2513 382/154 |
| 2010/0118218 A1* | 5/2010 | Eichenlaub | ................. | G02B 27/2214 349/15 |
| 2011/0134533 A1* | 6/2011 | Broman | ................. | G02B 5/021 359/599 |
| 2011/0211729 A1* | 9/2011 | Ramalingam | ................. | G06K 9/00201 382/103 |
| 2012/0122549 A1* | 5/2012 | Rasmussen | ................. | G07F 17/3211 463/20 |
| 2012/0237112 A1* | 9/2012 | Veeraraghavan | ................. | G06T 7/521 382/154 |
| 2013/0127847 A1* | 5/2013 | Jin | ................. | G06T 17/20 345/420 |
| 2013/0156329 A1* | 6/2013 | Szeliski | ................. | G06K 9/00214 382/218 |
| 2014/0037146 A1* | 2/2014 | Taguchi | ................. | G01B 11/2509 382/107 |
| 2014/0268160 A1* | 9/2014 | Debevec | ................. | G01N 21/55 356/445 |
| 2014/0294247 A1* | 10/2014 | Sirault | ................. | G06K 9/00 382/110 |
| 2015/0160002 A1* | 6/2015 | Nayar | ................. | G01B 11/25 356/610 |
| 2015/0178988 A1* | 6/2015 | Montserrat Mora | ... | G06T 13/40 345/420 |
| 2015/0304531 A1* | 10/2015 | Rodriguez Garcia | ................. | H04N 5/2224 345/419 |
| 2015/0371105 A1* | 12/2015 | Yang | ................. | G06K 9/4661 348/136 |
| 2016/0076878 A1 | 3/2016 | Tin et al. | ................. | G01B 11/22 |
| 2017/0018214 A1* | 1/2017 | Black | ................. | G02F 1/29 |
| 2017/0085867 A1* | 3/2017 | Baran | ................. | H04N 13/122 |
| 2017/0268990 A1 | 9/2017 | Martinello et al. | .... | G01B 11/02 |
| 2017/0270669 A1 | 9/2017 | Nezamabadi | ................. | G06T 7/0057 |
| 2017/0302902 A1 | 10/2017 | Martinello et al. | ................. | H04N 13/0018 |

OTHER PUBLICATIONS

Matusik, W., et al., "Image-based 3D photography using opacity hulls", ACM Transactions on Graphics (TOG), vol. 21, No. 3, pp. 427-437 (2002).

O'Toole, M., et al., "3D Shape and Indirect Appearance by Structured Light Transport" including Supplemental Document, Computer Vision and Pattern Recognition (CVPR) (IEEE Conference on), pp. 3246-3253 (2014).

J. Geng., "Structrued-light 3D surface imaging: a tutorial", Advances in Optics and Photonics 2, pp. 128-160 (2011).

* cited by examiner

SHAPE RECONSTRUCTION OF SPECULAR AND/OR DIFFUSE OBJECTS USING MULTIPLE LAYERS OF MOVABLE SHEETS

CROSS REFERENCE TO RELATED APPLICATIONS

This application claims benefit of priority from U.S. Provisional Application No. 62/440,979 filed Dec. 30, 2016, the content of which is incorporated by reference as if set forth here in full.

FIELD

The present disclosure relates shape reconstruction of physical objects using structured light and multiple layers of movable sheets which each include a transparent or windowed area, and is particularly well-suited for shape reconstruction of objects having a mirror-like or specular surface.

RELATED ART

For objects having a diffuse surface with Lambertian reflection characteristics, there has been considerable attention given to 3D shape reconstruction using structured light. As one example, a survey of various techniques is described by Geng, "Structured-light 3D surface imaging: a tutorial," Advances in Optics and Photonics, vol. 3, pages 128-180 (2011). As used herein, "shape reconstruction" is sometimes referred to also as "depth estimation".

3D reconstruction of a specular object remains a challenging task. While there are several techniques capable of accurate reconstruction of objects with a diffuse (also called Lambertian) surface, the 3D reconstruction of an object with a specular (or non-Lambertian) surface is still an open problem.

One challenge is due to the fact that the appearance of a specular object, or a highly glossy object, depends on the viewpoint and on the surrounding environment.

In addition, for specular and highly glossy objects, reflection by the object may be quite complicated, and in general may involve multiple reflections by the object itself, in the path of reflection from a light source to image capture. These multiple reflections violate underlying assumptions of conventional reconstruction techniques on the nature of reflections by the surface of the object, which typically assume only a single reflection at the surface of the object. Thus, the multiple reflections destabilize and otherwise invalidate calculations based on ray tracing or triangulation, at least to the extent that such calculations rely on the assumption of only a single reflection at the surface of the object.

The following documents may be helpful to those of ordinary skill:

Laurentini, A., "The visual hull concept for silhouette-based image understanding", Pattern Analysis and Machine Intelligence (IEEE Transactions on), vol. 16, no. 2, pages 150-162 (1994).

Matusik, W., et al., "Image-based 3D photography using opacity hulls", ACM Transactions on Graphics (TOG), vol. 21, no. 3, pages 427-437 (2002).

O'Toole, M., et al., "3D Shape and Indirect Appearance by Structured Light Transport", Computer Vision and Pattern Recognition (CVPR) (IEEE Conference on), pages 3246-3253 (2014).

SUMMARY

Previous applications by the applicant herein have considered techniques for shape measurement and reconstruction. As examples:

U.S. patent application Ser. No. 14/489,008, filed Sep. 17, 2014 by Siu-Kei Tin et al., "Depth Value Measurement Using Illumination by Pixels", now published at U.S. Patent Application Publication No. 2016/0076878. This application in general describes reconstruction of the shape of a specular object by using a system with multiple LCD display layers.

U.S. application Ser. No. 15/072,101, filed Mar. 16, 2016 by Mandi Nezamabadi, "3D Shape Reconstruction Using Projection Onto Electronic Light Diffusing Layers". This application in general also describes reconstruction of the shape of a specular object by using E-glass screens where each panel can be set to either diffuse or transparent. One advantage of an E-glass based system is the possibility to project a pattern directly onto the object (to reconstruct diffuse surfaces) when both screens are set to transparent.

U.S. Application No. 62/309,897, filed Mar. 17, 2016 by Manuel Martinello et al., "Separating Diffuse and Specular Components of a Glossy Object for Shape Reconstruction Using Electronic Light Diffusing Layers (E-Glass) and Polarized Light"; and U.S. application Ser. No. 15/359,404, filed Nov. 22, 2016 by Manuel Martinello et al., "Separating Diffuse and Specular Components of a Glossy Object for Shape Reconstruction Using Electronic Light Diffusing Layers (E-Glass) and Polarized Light" These applications in general describe the use of polarized light to separate diffuse and specular components of reflection from a heterogeneous object whose surface may include specular or highly glossy areas as well as diffuse areas, so as to permit more accurate shape reconstruction for such objects.

U.S. Application No. 62/323,531, filed Apr. 15, 2016 by Manuel Martinello et al., "Shape Reconstruction Including Silhouette Extraction Using Electronic Light Diffusing Layers (E-Glass)"; and U.S. Application No. 62/367,591, filed on Jul. 27, 2016 by Manuel Martinello, "Shape Reconstruction Including Silhouette Extraction Using Electronic Light Diffusing Layers (E-Glass)". These applications in general describe E-glass systems for silhouette extraction of the object being inspected. Extraction of the silhouette helps to resolve some ambiguities created by specular surfaces. In particular, along with the camera viewing parameters, the silhouette defines a back-projected generalized cone that contains the actual object. This cone is called a "silhouette cone". The intersection of two or more cones (captured from different viewpoints) is called visual hull, which is a bounding geometry of the actual 3D object.

U.S. Application No. 62/361,415, filed on Jul. 12, 2016 by Manuel Martinello et al., "Shape Reconstruction of Specular Objects in the Presence of Multiple Intra-Object Reflections"; and U.S. Application No. 62/367,600, filed on Jul. 27, 2016 by Manuel Martinello, "Shape Reconstruction of Specular Objects in the Presence of Multiple Intra-Object Reflections". These applications in general describe E-glass systems which use the visual hull of a specular object to distinguish between direct-bounce reflections and intra-object reflections in shape reconstruction of the specular object.

The contents of these applications are incorporated herein by reference as if set forth in full.

The foregoing applications include the use of plural transparency-controllable layers, such as multiple layers of E-glass, which are switchable between a transparent mode in which the glass is completely transparent, and a diffuse mode in which the glass assumes a frosted appearance. Images can be projected on or reflected onto the frosted appearance of the diffuse mode, and images captured thereby can be analyzed so as to reconstruct the 3D shape of an object under inspection. For example, sequences of coded patterns such as binary Gray scale patterns can be projected onto the E-glass layers while in the diffuse mode, and distorted images of these patterns, as reflected by the specular surface of a glossy object, can be analyzed to reconstruct the surface shape of the object.

Although E-glass layers, and other transparency-controllable layers such as LCD panels, have the convenience of electronic control without mechanical parts, they are sometimes not well-suited to particular environments or usage scenarios. For example: E-glass layers are generally heavy and require sturdy mounts. They can be relatively costly, particularly in consumer-based usage scenarios, and sometimes difficult to obtain commercially. In addition, once design decisions are made with respect to parameters such as pixel size, it is difficult to inject flexible into the resulting system.

Thus, according to one aspect described herein, reconstruction of the 3D shape of an object involves first and second movable sheets positioned in spaced-apart relation relative to each other. Each of the first and second sheets is movable to expose at least one transparent region and at least one pattern region to the inspection station. The pattern region is configured to bear a coded pattern thereon, such as by projection of a coded pattern thereon or by a sequence of patterns pre-printed or formed directly onto an elongate pattern region.

In some embodiments described herein, particularly those in which coded patterns are projected onto the pattern region, the pattern regions of the first and second sheets are translucent, such that the projected pattern is visible from the reverse side of the sheet. Shape reconstruction of diffuse regions on the surface of the object may proceed by moving both of the first and second sheets to expose the transparent region, and by projecting patterned light onto the object. Based on captured images of the pattern projected onto the object, the shape of the surface of an object having at least some diffuse characteristics may be reconstructed. Diffuse components may be separated from specular components in the captured images, such as by use of varying angles of polarization in polarized light, and the shape of the surface of the object may be reconstructed using the diffuse components.

Shape reconstruction of specular regions on the surface of the object may proceed by first and second phases. In the first phase the first sheet is moved to the pattern region and the second sheet is moved to the transparent region, and a first sequence of patterned light is projected onto the pattern region of the first sheet. In the second phase the first sheet is moved to the transparent region and the second sheet is moved to the pattern region, and a second sequence of patterned light is projected onto the pattern region of the second sheet. Based on the captured images, the shape of the surface of an object having at least some specular characteristics is reconstructed. Diffuse components may be separated from specular components in the captured images, such as by use of varying angles of polarization in polarized light, and the shape of the surface of the object may be reconstructed using the specular components. Direct reflections from the object may be differentiated from intra-object reflections by extracting a visual hull of the object, separating between light paths having direct single reflections and light paths having indirect multi-reflections in the images of the reflected patterns, by calculations using the visual hull, and reconstructing the shape of the surface of the object using the light paths having direct single reflections.

The coded sequences of patterned light may comprise a sequence of binary patterns of horizontal and vertical stripe patterns, wherein each pattern in the sequence has a spatial frequency that differs from others of the patterns in the sequence, such as patterns formed using binary Gray codes.

In some embodiments described herein, coded patterns are pre-printed or formed directly onto an elongate pattern region. The coded sequences of patterns may comprise a sequence of binary patterns of horizontal and vertical stripe patterns, wherein each pattern in the sequence has a spatial frequency that differs from others of the patterns in the sequence, such as patterns formed using binary Gray codes. Shape reconstruction of specular regions on the surface of the object may proceed by first and second phases. In the first phase the first sheet is moved to each sequential pattern of the pattern region and the second sheet is moved to the transparent region. In the second phase the first sheet is moved to the transparent region and the second sheet is moved to each sequential pattern of the pattern region. Based on wherein based on the captured images, the shape of the surface of an object having at least some specular characteristics is reconstructed.

The sheets may be transparent and they may be opaque or translucent, in which case the transparent regions may be formed by windows removed from the sheets.

This brief summary has been provided so that the nature of this disclosure may be understood quickly. A more complete understanding can be obtained by reference to the following detailed description and to the attached drawings.

DETAILED DESCRIPTION

First Embodiment

Figure 1A:
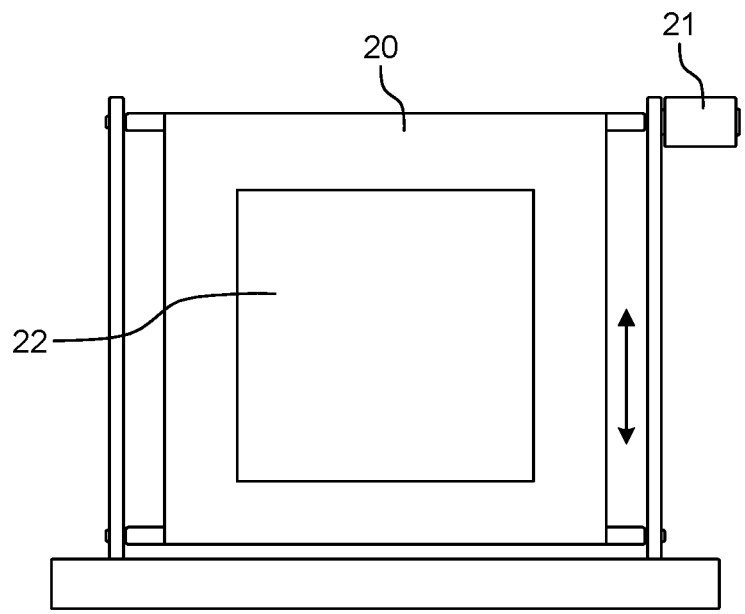
FIGS. 1A and 1B are views showing a movable sheet movable by rollers to expose a transparent region as shown in FIG. 1A and a pattern region as shown in FIG. 1B.
Figure 1B:
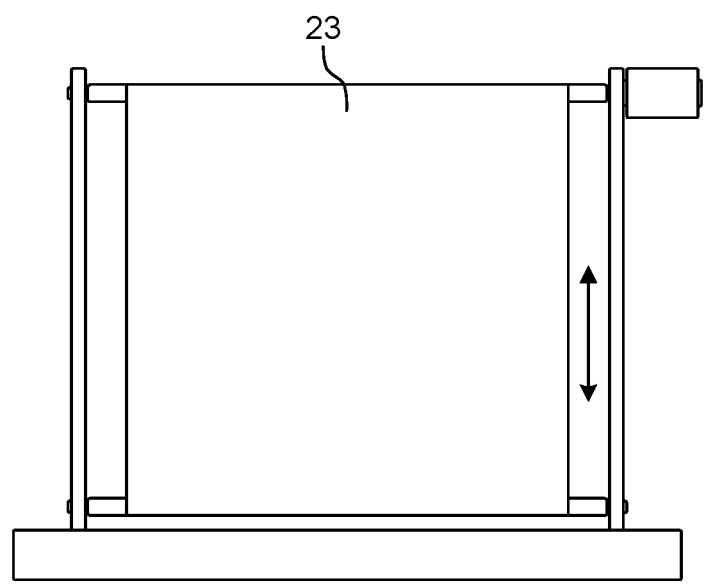

FIGS. 1A and 1B are views showing a movable sheet 20 movable by rollers 21 to expose a transparent region 22 as shown in FIG. 1A and a pattern region 23 as shown in FIG. 1B. In this embodiment, sheet 20 is translucent such that images projected onto the obverse side of pattern region 23 are visible from the reverse side thereof. Transparent region 22 is formed by a window cut out from sheet 20.

Figure 1C:
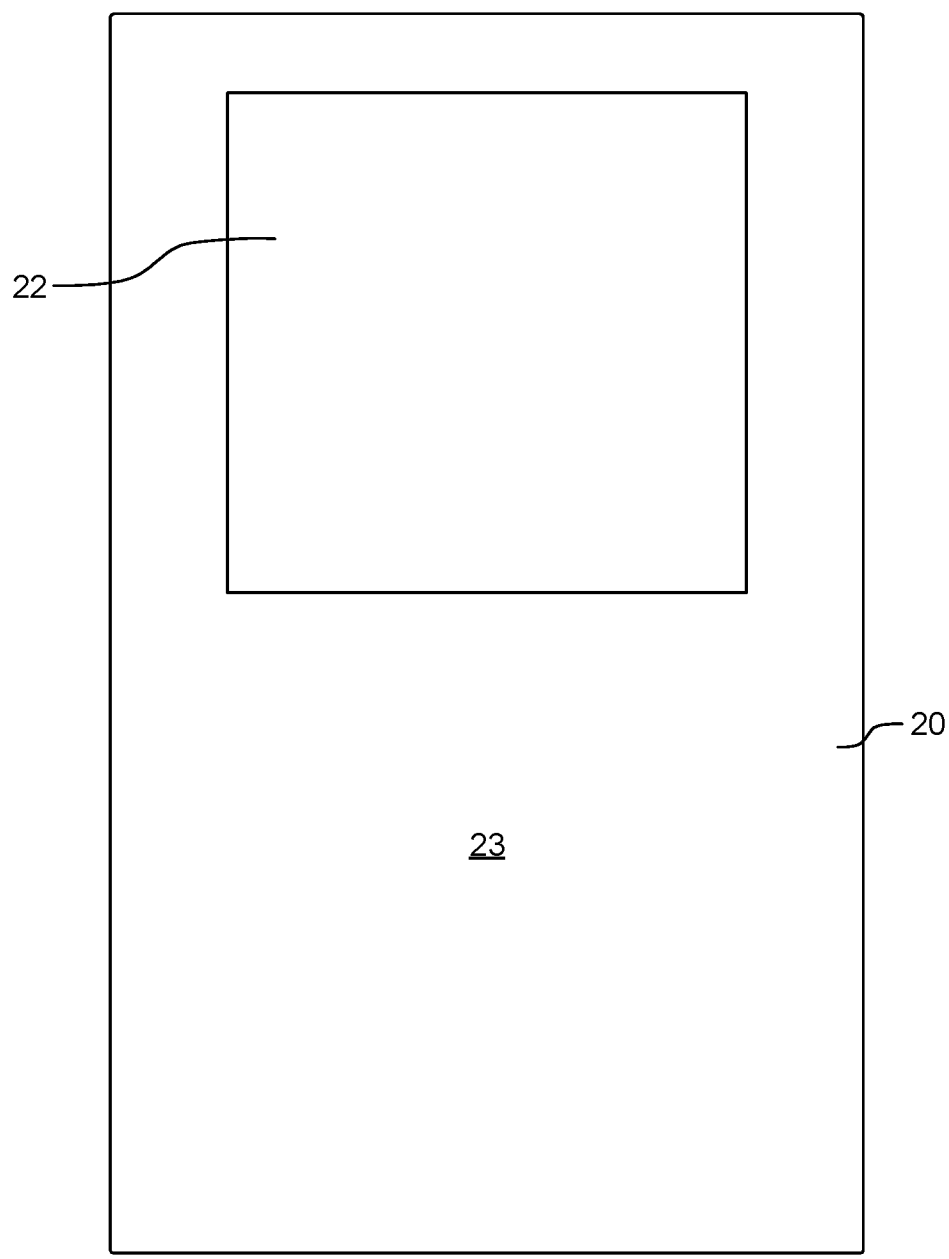
FIG. 1C is a view showing the unrolled sheet depicted in FIGS. 1A and 1B.

FIG. 1C is a view showing sheet 20 in unrolled form. Generally speaking, the movable sheets described herein have at least one transparent region and at least one pattern region. As seen in FIG. 1C, this embodiment uses one transparent region 22 in the form of a cut out window, and one pattern region 23 onto which coded patterns may be projected.

Figure 1D:
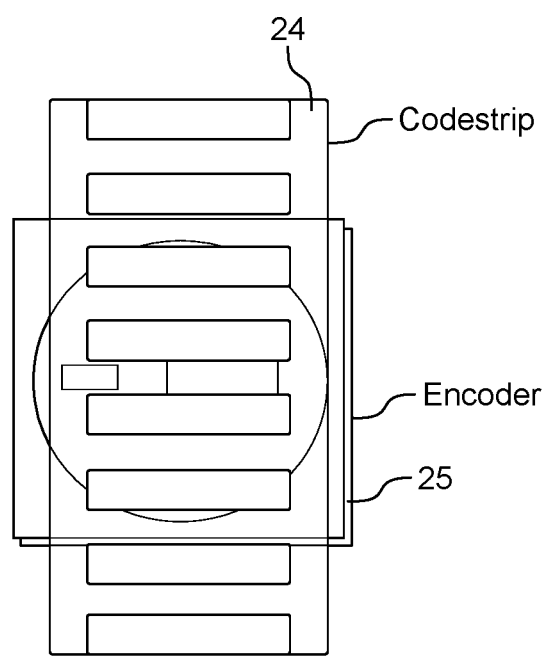
FIG. 1D is a view showing a linear encoder for precise positioning of the movable sheet.

FIG. 1D is a view showing a linear encoder. In some embodiments, precise positioning of the movable sheet is helpful, such as for repeated re-positionings of the sheet to the same position, or for precision in relative positioning as between a first movable sheet and second movable sheet. Such embodiments may use a linear encoder such as that shown in FIG. 1D in which a codestrip 24 is affixed to the edge of sheet 20, and an encoder 25 optically encodes the position of the codestrip.

Figure 2:
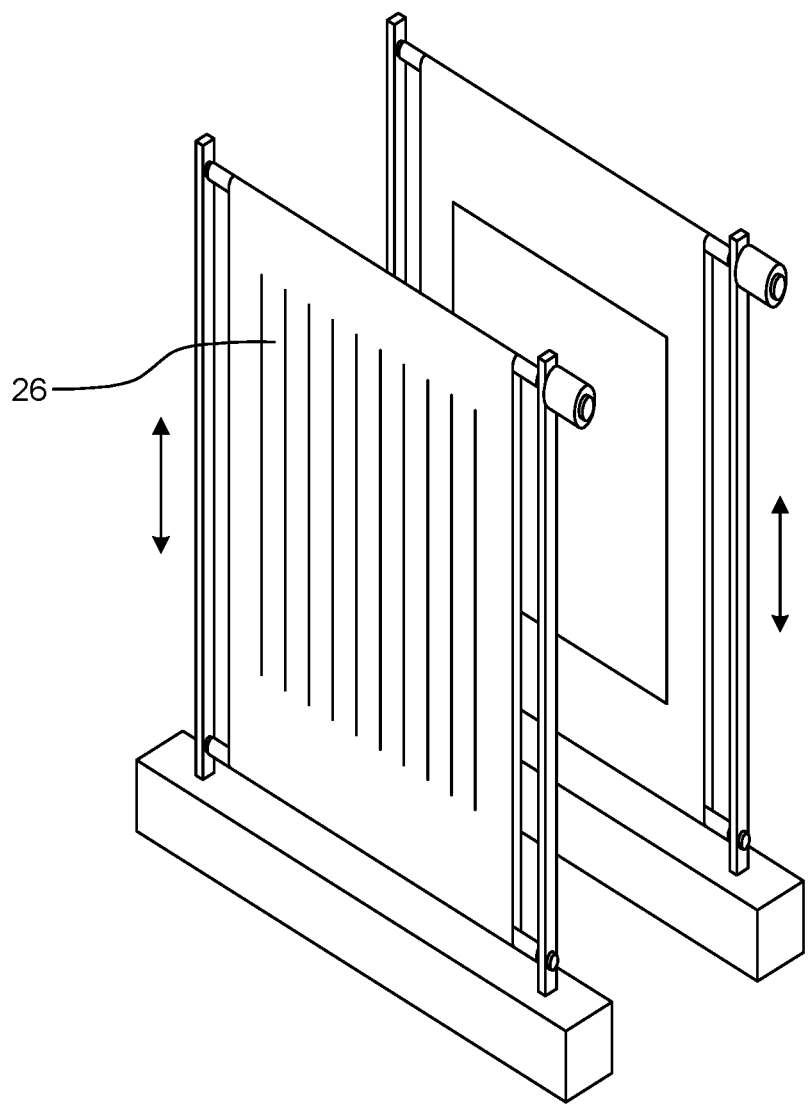
FIG. 2 is a view depicting first and second movable sheets positioned in spaced-apart relation relative to each other.

FIG. 2 is a view depicting first and second movable sheets positioned in spaced-apart relation relative to each other. The sheets are movable independently such as on rollers. For example, as shown in FIG. 2, a first sheet is moved so that the transparent region is exposed, while the second sheet is moved so that the pattern region is exposed. In FIG. 2, a coded pattern 26 is shown as projected onto the pattern region of the second sheet.

Figure 3:
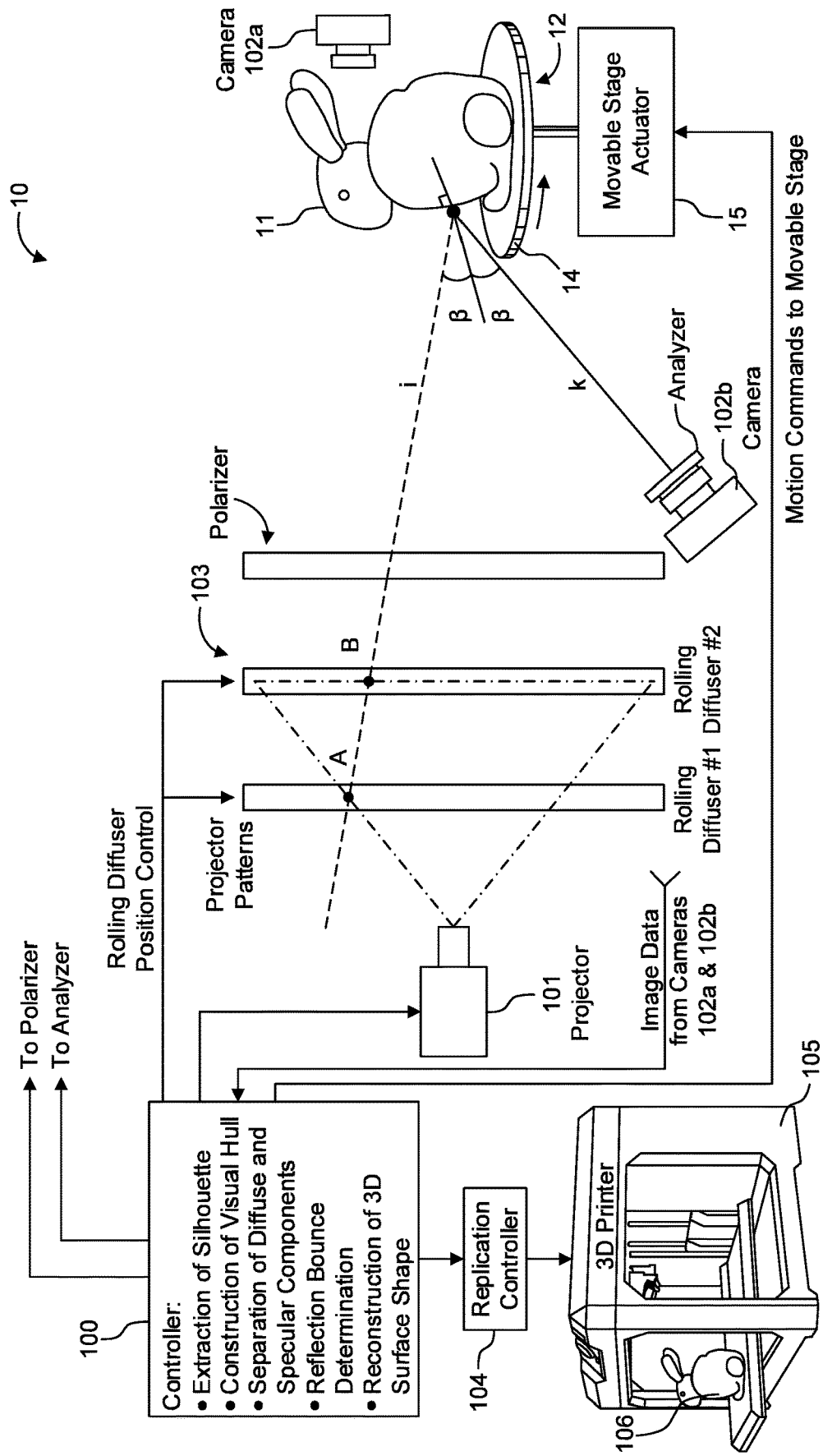
FIG. 3 is a view showing one example embodiment of a system for recovery of surface shape of an object which may have diffuse and/or specular regions, using the movable sheets of FIGS. 1A through 1C.

FIG. 3 is a view showing one example embodiment of a system for recovery of surface shape of objects such as objects whose reflection characteristics include both a specular component and a diffuse component, in the form of a replication system 10 in which surface shape of objects is recovered for replication, for example, for 3D replication of the object physically (such as with a 3D printer) or representationally (as with a graphics display).

While FIG. 3 depicts a replication environment, it should be understood that this is simply an example environment in which the disclosure herein may be practiced, and that other environments or embodiments are of course possible. For example, recovery of surface shape can also be used in the context of automated inspection, robotics, gripping and positioning, machine vision, quality control, defect detection, image retrieval, shape modelling and scene reconstruction, security and so forth, among many others.

As shown in FIG. 3, an object 11 is positioned at an inspection station 12, which in this embodiment is the surface of a movable stage 14 by which the object can be moved into varying perspectives. In this embodiment, the movable stage is movable by rotation about a vertical axis, and in other embodiments the movable stage may be a 3-axis positioning table. Object 11 is typically a specular object or a mirror-like object, or other similar object with a glossy or highly glossy surface, exhibiting reflection characteristics that include both specular and diffuse components. Movable stage 14 is moved under control of actuator 15, via motion commands issued by controller 100 for reconstruction of surface shape.

Controller 100 is configured to reconstruct surface shape of objects at inspection station 12, based on commands issued to projector 101, commands issued to movable sheets 103 at rolling diffuser stations #1 and #2, and commands issued to actuator 15 for movable stage 14; and based on image data received from an image capture system which in this embodiment includes digital cameras 102a and 102b. Based on the reconstruction obtained by controller 100, controller 100 controls replication controller 104 so as to obtain a 3D replication of the object. In this embodiment, 3D replication of the object is obtained physically via 3D printer 105, to produce replicated object 106. In other embodiments, 3D replication of the object may be obtained representationally via a graphics display. More details of controller 100 are provided below, such as in connection with FIG. 3.

FIG. 3 further depicts plural movable sheets 103, positioned in spaced-apart relation relative to each other. In the FIG. 3 embodiment, there are two spaced-apart movable sheets and in other embodiments there may be three or more spaced-apart movable sheets. Under control from controller 100, each movable sheet is independently movable so as to expose its transparent region 22 and its pattern region 23.

The movable sheets 103 are positioned in spaced-apart relation to each other, such that by using the relative positionings of the movable sheets to projector 101 and cameras 102a and 102b, ray-tracing and/or triangulation techniques allow reconstruction of the 3D surface shape of the object 11 under inspection. The relative positionings are predetermined through calibration. More details on the relative positionings of movable sheets 103, relative to other elements such as projector 101 and the image capture system, and calibration, are described in the afore-mentioned U.S. application Ser. No. 15/072,101, which is incorporated by reference.

In addition to the plural movable sheets 103, the FIG. 3 embodiment also includes a pair of polarizers, one configured to polarize light and the other configured to analyze polarized light. In the FIG. 3 embodiment, the first polarizer is positioned between the E-glass layers and the object, so as to polarize light illuminated toward the object. The second polarizer is positioned in front of camera 102b so as to permit analysis of the polarization state of light reflected from the object.

More particularly, with respect to the pair of polarizers in the FIG. 3 embodiment, one is used as a polarizer to polarize the incident light before it reaches the object; and the other is used as an analyzer to analyze the light reflected off the object. Either the analyzer or the polarizer can rotate, or both can rotate.

In the FIG. 3 embodiment, the pair of polarizers are usable to separate a diffuse component of reflection from a specular component of reflection. Each surface point on highly glossy or heterogeneous objects will typically reflect in both modes, and separation of each component facilitates accurate surface reconstruction for such objects. It should be understood that in some embodiments, where mainly specular reflections are expected, with little or no diffuse reflection, the polarizers may be omitted, and processing to separate diffuse and specular components of reflection may likewise be omitted.

In embodiments which separate diffuse and specular components of reflection, separation of these components is described in the afore-mentioned U.S. Application No. 62/309,897, and U.S. application Ser. No. 15/359,404, incorporated by reference herein.

Briefly, as explained in greater detail in said Application No. 62/309,897 and Ser. No. 15/359,404, to obtain a diffuse component of reflection from the object 11 at the inspection station, all movable sheets are positioned to the transparent region, and projector 101 projects the patterns directly onto the surface of the diffuse object. The state of polarization is varied, and camera 102b captures images of the patterns as projected onto the object. The nature and intensity of the captured images varies in accordance with the variation in the state of polarization, which allows for separation of diffuse and specular components of reflection. The diffuse component allows the depth for each pixel of the object at the inspection station to be calculated based on traditional triangulation methodology.

To obtain a specular component of reflection, each different one of the movable sheets is in turn moved to expose its pattern region set with all others moved to expose the transparent region, and projector 101 projects patterns so as to illuminate the object by the patterns projected onto the pattern region. The state of polarization is varied, and images are captured of the structured light pattern as reflected by the glossy surface of the object. The nature and intensity of the captured images varies in accordance with the variation in the state of polarization, which allows for separation of diffuse and specular components of reflection. By projecting multiple different patterns, such as multiple different Gray code patterns, and by sequencing through each of the movable sheets for each pattern, the 3D shape of the entirety of the visible surface of the object can be reconstructed by analysis of the specular component of the captured images of the distorted reflections of the patterns caused by the surface of the object.

In embodiments which do not separate the diffuse component of reflection from the specular component of reflection, the polarizer and the analyzer may be omitted.

The position of camera and the movable sheets 103 are determined during a calibration process and stored for later computations. The correspondences between camera pixels and points of the patterns projected onto the movable sheets are established by projecting coded patterns, different from each other, such that each location on the sheet is uniquely identifiable. The patterns may, for example, be patterns of horizontal and vertical stripe patterns, such as binary patterns, each pattern in the sequence having a spatial frequency that differs from others of the patterns in the sequence, such as Gray code patterns.

Projector 101 in this embodiment has an autofocus function, by which patterns projected by the projector are automatically focused onto the surface where the patterns are projected. This provides an advantageous benefit: because the movable sheets are moved to expose transparent regions and pattern regions. The surface onto which patterns are projected is likewise changed. For example, in a circumstance when an innermost movable sheet at rolling diffuser #1 is moved to expose the pattern region, patterns are projected onto the innermost layer. The focus distance in this circumstance differs from a circumstance when the innermost movable sheet at diffuser #1 is moved to expose the transparent region and the outermost sheet at diffuser #2 is moved to expose the pattern region. In this case, patterns are projected onto the outermost sheet. Both of these focus distances are different from the circumstance when all movable sheets are moved to expose their transparent regions, the object is diffuse, and patterns are projected directly onto the surface of the diffuse object. The autofocus function of projector 101 responds automatically to these changes in focus distance, ensuring that the projected patterns remain in focus regardless of the surface onto which they are projected.

As depicted in FIG. 3, controller 100 provides commands to the pair of polarizers (i.e., to the polarizer and to the analyzer), position commands (for example, to expose the pattern region vs. the transparent region) to the movable sheets 103, pattern commands (such as Gray code patterns) to the projector, motion commands to the movable stage, and replication commands to the replication controller. Controller 100 receives image data from the image capture system, and uses the image data for functionality which includes functionality to extract a silhouette of the object, functionality to construct a visual hull for the object, functionality to separate diffuse and specular components of reflection in the captured images, functionality to determine the number of reflections encountered by a light ray reflected by the surface of the object (sometimes referred to herein as the number of "bounces"), and functionality to reconstruct the 3D surface shape of the object based on the captured image data.

Figure 4:
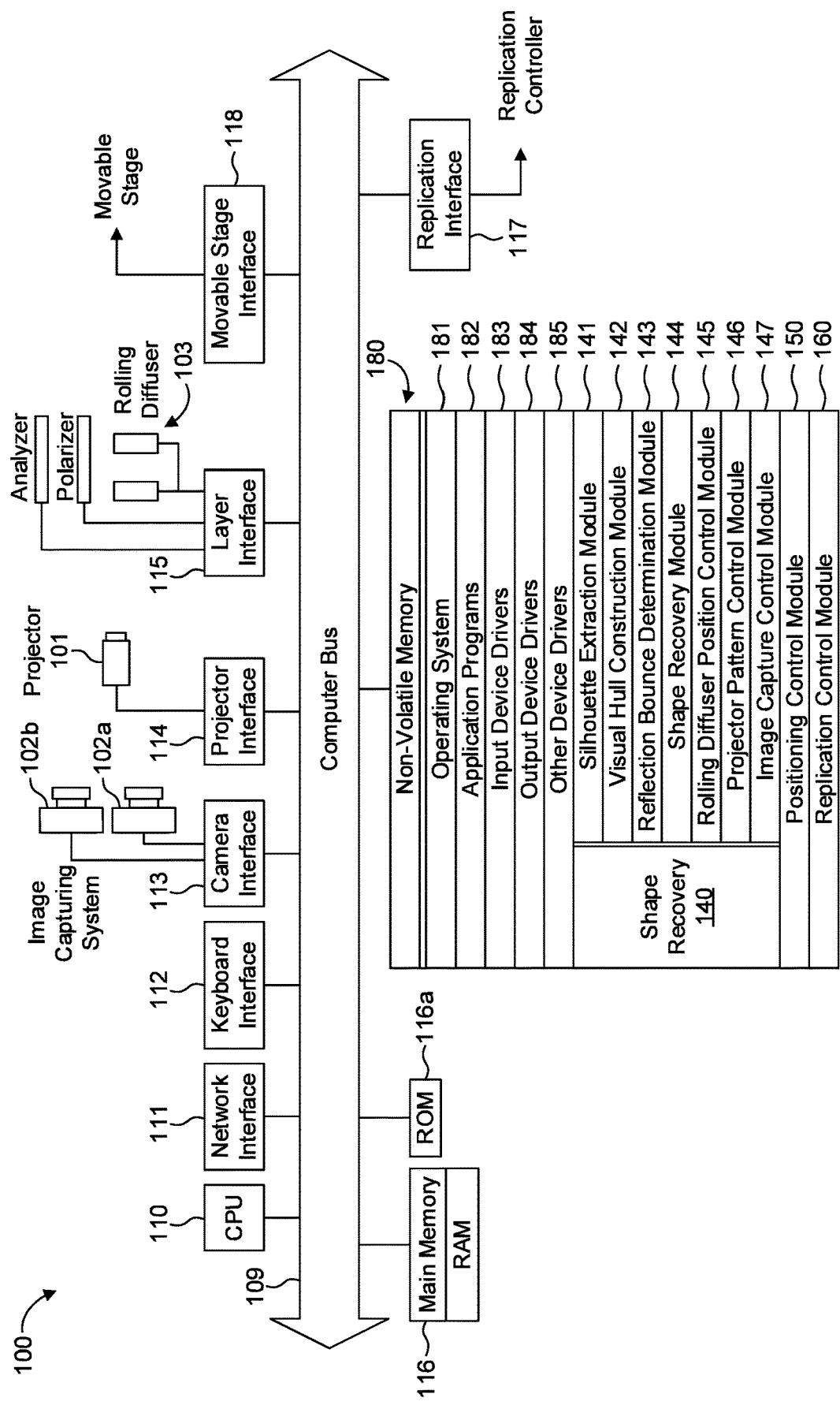
FIG. 4 is a view for explaining one embodiment of the architecture of the controller shown in FIG. 3.

FIG. 4 is a view for explaining one embodiment of the architecture of controller 100 for shape reconstruction of objects at inspection station 12.

As shown in FIG. 4, controller 100 includes central processing unit (CPU) 110 which interfaces with computer bus 109. Also interfacing with computer bus 109 are network interface 111, keyboard interface 112, camera interface 113 which interfaces to the image capture system including cameras 102a and 102b, projector interface 114 which interfaces to projector 101, layer interface 115 which interfaces to the plural movable sheets 103 and to the polarizer and the analyzer, movable stage interface 118 which interfaces to actuator 15 of movable stage 14, random access memory (RAM) 116 for use as a main run-time transient memory, read only memory (ROM) 116a, replication interface 117 for interface to replication controller 104, and non-volatile memory 180 (e.g., a hard disk or other non-volatile and non-transitory storage medium).

RAM 116 interfaces with computer bus 109 so as to provide information stored in RAM 116 to CPU 110 during execution of the instructions in software programs, such as an operating system, application programs, image processing modules, and device drivers. More specifically, CPU 110 first loads computer-executable process steps from non-volatile memory 180 or another storage device into a region of RAM 116. CPU 110 can then execute the stored process steps from RAM 116 in order to execute the loaded computer-executable process steps. Data also can be stored in RAM 116 so that the data can be accessed by CPU 110 during the execution of the computer-executable software programs, to the extent that such software programs have a need to access and/or modify the data.

As also shown in FIG. 4, non-volatile memory 180 contains computer-executable process steps for operating system 181 and for application programs 182, such as graphic image management programs. Non-volatile memory 180 also contains computer-executable process steps for device drivers for software interface to devices, such as input device drivers 183, output device drivers 184, and other device drivers 185.

Non-volatile memory 180 also stores a shape recovery module 140, a positioning control module 150, and replication control module 180. These modules, i.e., the shape recovery module 140, the positioning control module 150, and the replication control module 180, are comprised of computer-executable process steps for 3D shape reconstruction of the surface shape of an object, for repositioning of the object on movable stage 14, and for control of replication controller 104 for 3D replication of the object.

As shown in FIG. 4, shape recovery module 140 generally comprises silhouette extraction module 141 for extracting a silhouette of a foreground object positioned against a background, a visual hull construction module 142 for constructing a visual hull using the extracted silhouette, a reflection bounce determination module 143 for determining the number of bounces encountered at the surface of the object by a light ray, and shape recovery module 144 for recovery of surface shape of the object under inspection. Shape recovery module 140 also generally comprises a rolling diffuser position control module 145 for control over the position of each of the plural sheets 103, a projector pattern control module 146 which stores one or more background patterns together with plural sequences of patterned light patterns and which controls projection of the plural sequences of background patterns and patterned light patterns by projector 101, as well as image capture control module 147 for control of image capture by image capturing system 102.

Unshown in FIG. 4 is a further module, also stored in non-volatile memory 180, for control over the pair of polarizers, so as to rotate the polarizer and/or the analyzer and alter the state of polarization, for those embodiments that separate diffuse and specular components of reflection.

Positioning control module 150 controls repositioning of the object on movable stage 14, and replication control module 180 controls replication controller 104 for 3D replication of the object.

With respect to movable stage 14, controller 100 issues positioning commands to reposition movable stage 14 and the object thereon. At each position, by control over the movable sheets 103 and pattern projection, multiple silhouettes of the foreground object may be extracted. The extracted silhouettes may be used to construct a visual hull of the object, and the visual hull may be used to determine the number of bounces for a reflected light ray. Repositioning of the object exposes other areas of its surface to image capture and illumination by the layers, and thereby permits 3D shape reconstruction with as much of the entirety of the object as desired.

The computer-executable process steps for these modules may be configured as part of operating system 181, as part of an output device driver in output device drivers 121, or as a stand-alone application program(s). These modules may also be configured as a plug-in or dynamic link library (DLL) to the operating system, device driver or application program. It can be appreciated that the present disclosure is not limited to these embodiments and that the disclosed modules may be used in other environments.

Shape Reconstruction in the Presence of Multi-Reflections

With respect to images of the reflected patterns, some embodiments may differentiate between light paths having direct single reflections and light paths having indirect multi-reflections, and some embodiments may not make such a differentiation. For embodiments which make such a differentiation, shape reconstruction is able to use light paths corresponding to direct single reflection and to ignore light paths having indirect multi-reflections such as intra-object reflections. Such differentiation is described in detail in the afore-mentioned Application No. 62/361,415 and Application No. 62/367,600, incorporated by reference herein.

For such embodiments, in a captured image of a specular object using the system shown above, or when working with the separated-out specular component of a captured image, there are three (3) different categories of ray paths, as explained in the afore-mentioned applications:

0-bounce: camera rays (corresponding to camera pixels) that do not hit the target object.

1-bounce or direct: rays that hit the object once and then bounce to or from the movable sheets.

N-bounce or indirect where N is greater than or equal to two (2): rays that hit the object multiple times such as due to concave regions of the object, and then bounce to the movable sheets.

The system described herein utilizes shape reconstruction techniques which distinguish between these three categories. Principally, the technique is divided in two tasks: (1) Reconstruct the visual hull of the object; and (2) Starting from the visual hull, measure the shape by triangulating only the direct paths (i.e., the 1-bounce paths).

The first task is achieved by extracting the silhouette of the object at each view and then combining them together using the angle of rotation of each pose/camera. Extraction of the silhouette, and construction of the visual hull, is described in the afore-mentioned U.S. Application No. 62/323,531.

Figure 5:
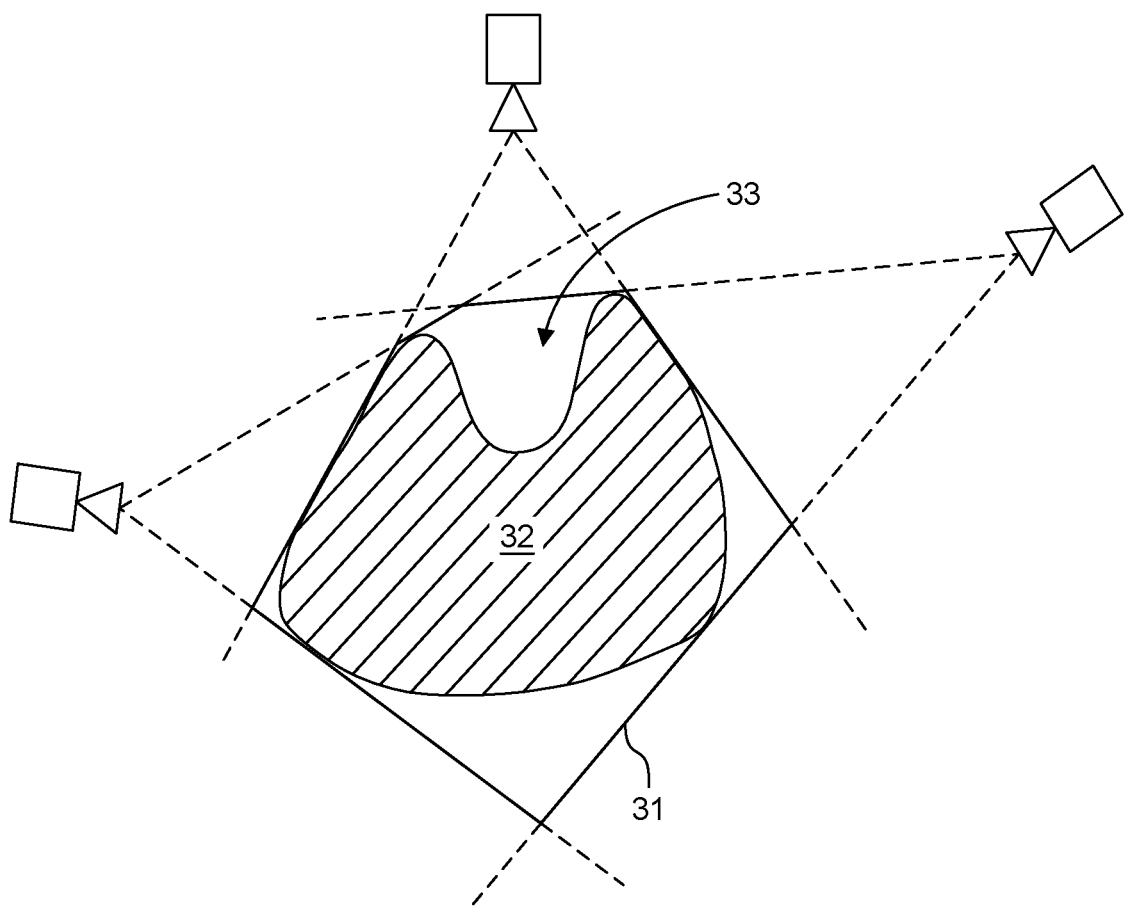
FIG. 5 shows an example of 2D visual hull for an object that includes concave areas.

FIG. 5 shows an example of a 2D visual hull 31 for an object 32 that includes concave areas such as area 33. The visual hull is estimated by combining silhouettes from different viewpoints. As shown in FIG. 5, concave regions cannot be properly reconstructed using only the visual hull.

Using the estimated visual hull, the second task is performed, so as to distinguish the 1-bounce paths and to triangulate using only the 1-bounce paths.

One challenge of the second task is to distinguish direct reflections (1-bounce paths) from multi-reflections (N-bounce paths). As explained in Application No. 62/367,600, distinguishing direct, single bounce reflections capitalizes on three properties of light ray reflection in the system.

Property #1: In a direct reflection (1-bounce paths), the camera ray (given by the camera pixel) and the light ray (given by the code read from the screens) are coplanar; in other words they lie on the epipolar plane.

Property #2: A generic multi-bounce path (N-bounce paths) usually does not keep the rays coplanar. This has been demonstrated by M. O'Toole et al., cited above, and acts as a computationally-simple first step in determining whether to exclude a reflection from the reconstruction of surface shape.

Property #3: In the rare event that the rays of a multi-bounce path are coplanar, they probably meet outside the visual hull. It should be understood that the rays of all multi-bounce paths usually meet outside the visual hull, regardless of whether the rays are or are not coplanar. On the other hand, direct reflections (1-bounce paths) will lie within the visual hull.

Figure 6:
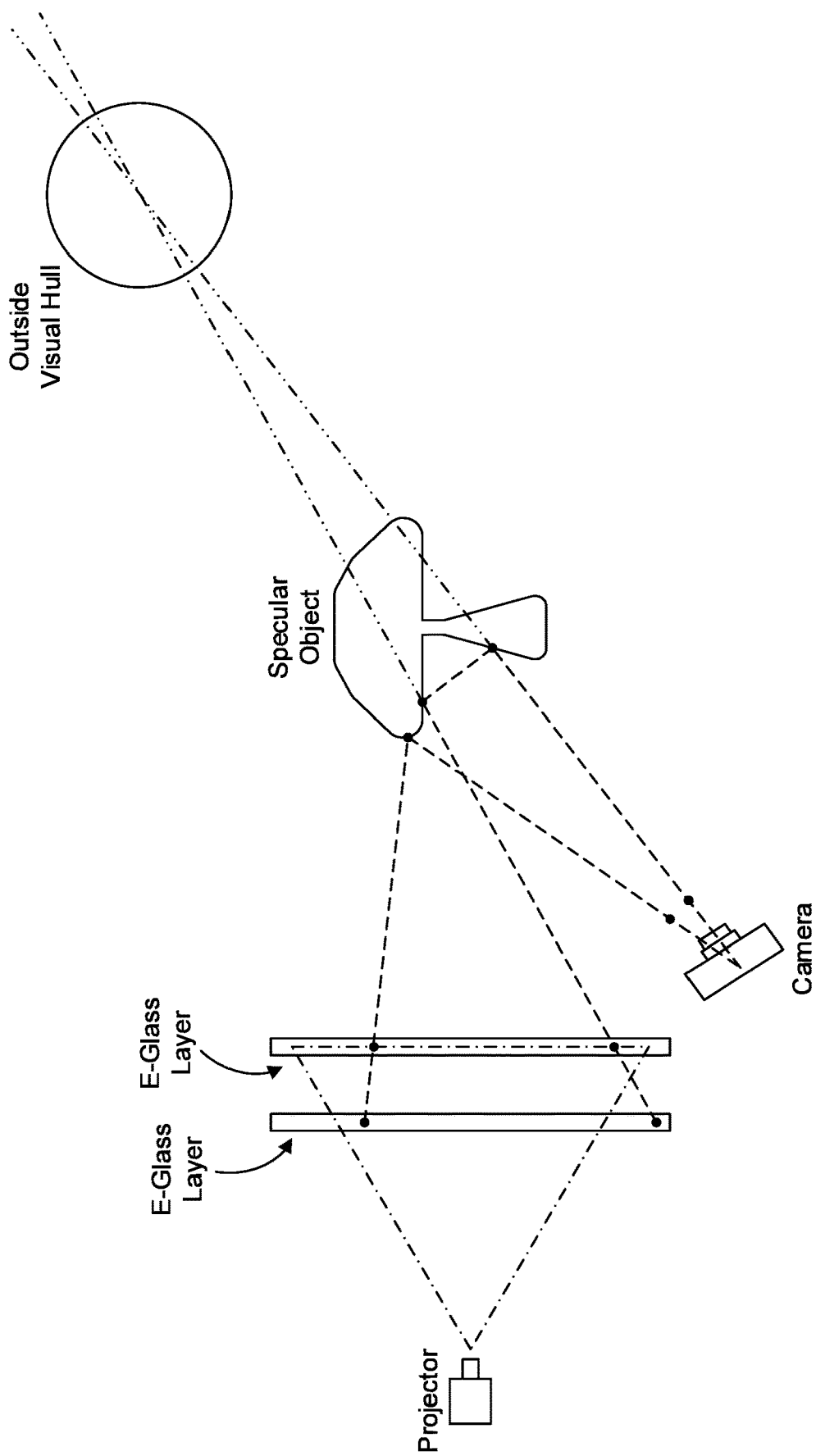
FIG. 6 is an illustration of a multi-bounce path, demonstrating that for a multi-bounce situation, the light rays meet outside the visual-hull of the object.

FIG. 6 is an illustration of a multi-bounce path, demonstrating that for a multi-bounce situation, the light rays meet outside the visual-hull of the object. This is consistent with property #3.

Thus, according to the disclosure herein, direct paths are distinguished from multi-reflection paths based at least on whether the rays do or do not meet inside the visual hull. Once the direct paths are distinguished from the multi-reflection paths, ray triangulation is used only on the direct paths, while excluding the multi-reflection paths, so as to obtain the concave areas missing from the reconstruction of the visual hull.

Figure 7:
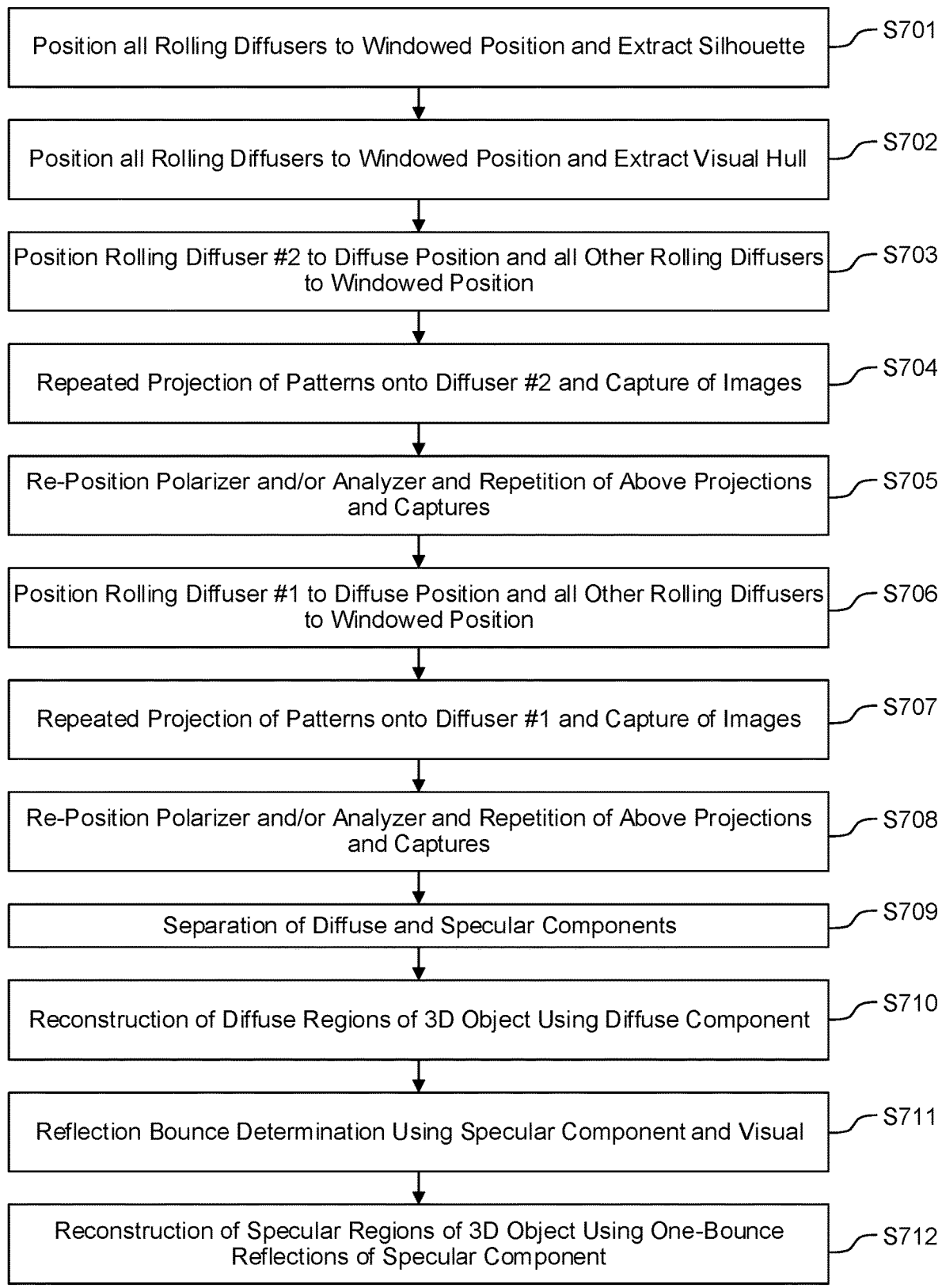
FIG. 7 is a flow diagram for explaining shape reconstruction according to the disclosure herein.

FIG. 7 is a flow diagram for explaining shape reconstruction according to the disclosure herein. In this embodiment, the process steps shown in FIG. 7 are stored on non-transitory memory such as fixed disk 180 and are executed by CPU 100 of controller 100.

In connection with the steps shown in FIG. 7, in steps S701 and S702, all rolling diffusers are positioned to expose their transparent regions, a silhouette of the object is extracted, and a visual hull for the object is extracted. As mentioned above, for embodiments that do not differentiate between light paths having direct single reflections and light paths having indirect multi-reflections, steps S701 and S702 may be omitted.

In step S703, rolling diffuser #2 is positioned to expose its pattern region and all other rolling diffusers are positioned to expose their transparent regions.

In step S704, projector 101 makes repeated projections of coded patterns onto the pattern region of the movable sheet in rolling diffuser #2, and corresponding images of the distorted reflections of these patterns, as reflected by the surface of the object, are captured.

In step S705, the polarizer and/or analyzer are repositioned so as to vary the angle of polarization, the projections and captures of step S704 are repeated. As mentioned above, in embodiments which do not separate the diffuse component of reflection from the specular component of reflection, step S705, with its repositioning of the polarizer and the analyzer, and its repetition of projections and image captures, may be omitted.

In step S706, rolling diffuser #1 is positioned to expose its pattern region and all other rolling diffusers are positioned to expose their transparent regions.

In step S707, projector 101 makes repeated projections of coded patterns onto the pattern region of the movable sheet in rolling diffuser #1, and corresponding images of the distorted reflections of these patterns, as reflected by the surface of the object, are captured.

In step S708, the polarizer and/or analyzer are repositioned so as to vary the angle of polarization, the projections and captures of step S707 are repeated. As mentioned above, and like step S705, in embodiments which do not separate the diffuse component of reflection from the specular component of reflection, step S708, with its repositioning of the polarizer and the analyzer, and its repetition of projections and image captures, may be omitted.

In step S709, for embodiments which do separate the diffuse component of reflection from the specular component of reflection, the diffuse and specular components are separated.

In step S710, diffuse regions of the object are reconstructed using diffuse components of reflection. This step may be omitted for embodiments that reconstruct specular objects not containing significant diffuse regions.

In step S711, for embodiments that do differentiate between light paths having direct single reflections and light paths having indirect multi-reflections, light paths having a direct single reflection are determined based on intersection with the visual hull extracted in step S702. For embodiments that do not differentiate between light paths having direct single reflections and light paths having indirect multi-reflections, step S711 may be omitted.

In step S712, the surface shape of specular regions of the object is reconstructed using the captured images. For embodiments that do differentiate between light paths having direct single reflections and light paths having indirect multi-reflections, light paths having indirect multi-reflections are exclude, and only light paths having a direct single reflection, as determined in step S711, are used.

Another Embodiment

Figure 8:
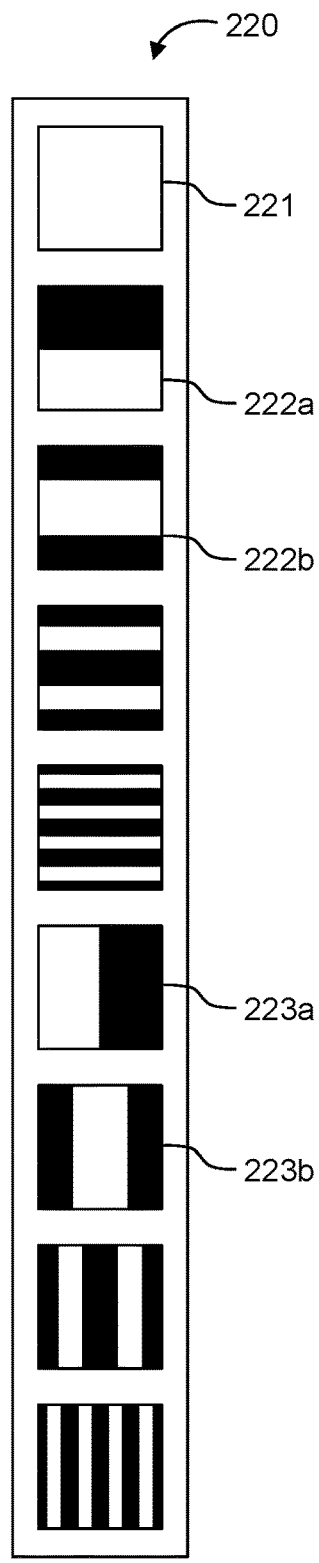
FIG. 8 is a view showing an unrolled elongate movable sheet in which coded patterns are pre-printed or formed directly onto an elongate pattern region.

FIG. 8 is a view showing an unrolled elongate movable sheet according to a second embodiment, in which coded patterns are pre-printed or formed directly onto an elongate web which includes multiple pattern regions.

As shown in FIG. 8, an elongate sheet 220 includes a transparent region 221 and multiple pattern regions such as regions 222a, 222b, 223a and 223b. Each of the patterned regions has formed thereon a coded pattern such as a Gray code pattern. In the example of FIG. 8, pattern regions 222a and 22b are Gray code patterns in the horizontal direction, and pattern regions 223a and 223b are Gray code patterns in the vertical direction.

In this embodiment, as in the embodiment described above, first and second ones of movable sheets 220 are positioned in spaced-apart relation relative to each other. The sheets are movable independently such as on rollers. A linear encoder such as that shown in FIG. 1D may be affixed to the edge of each sheet, for purposes of accurate positionings and re-positionings.

Figure 9:
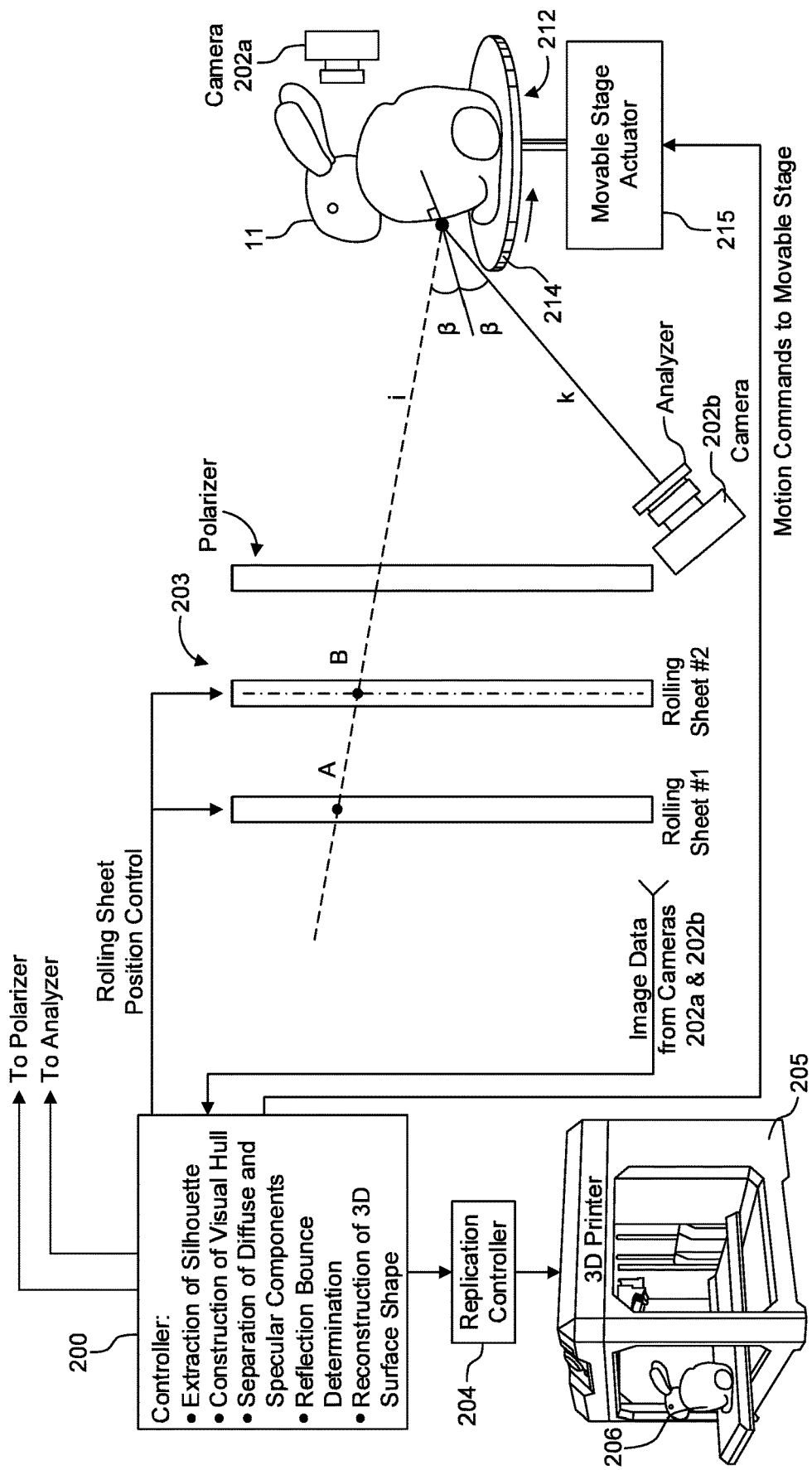
FIG. 9 is a view showing one example embodiment of a system for recovery of surface shape of an object which may have diffuse and/or specular regions, using the movable sheets depicted in FIG. 8.

FIG. 9 is a view showing one example embodiment of a system for recovery of surface shape of an object which may have diffuse and/or specular regions, using the movable sheets depicted in FIG. 8. Reference numbers used in FIG. 9 are similar to reference numbers used in FIG. 3, and a detailed description thereof is therefore omitted in the interests of brevity.

In one difference as between FIGS. 3 and 9, because the movable sheets 203 of FIG. 9 have coded patterns pre-printed or formed directly thereon, a projector may be omitted.

Figure 10:
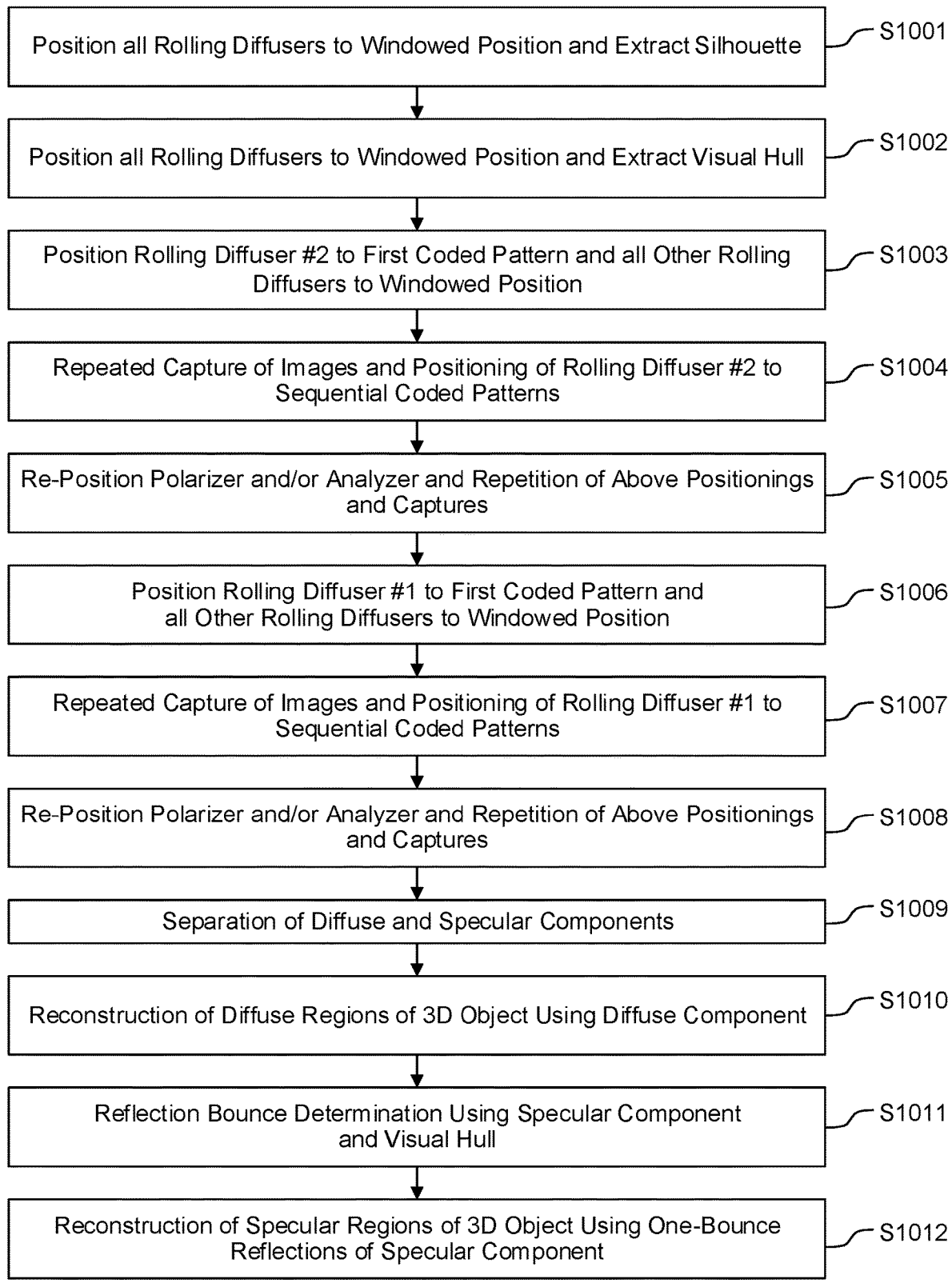
FIG. 10 is a flow diagram for explaining shape reconstruction according to the disclosure herein.

FIG. 10 is a flow diagram for explaining shape reconstruction according to the disclosure herein.

In steps S1001 and S1002, all rolling diffusers are positioned to expose their transparent regions, a silhouette of the object is extracted, and a visual hull for the object is extracted. As mentioned above, for embodiments that do not differentiate between light paths having direct single reflections and light paths having indirect multi-reflections, steps S1001 and S1002 may be omitted.

In step S1003, rolling diffuser #2 is positioned to expose its first coded pattern region and all other rolling diffusers are positioned to expose their transparent regions.

In step S1004, there are repeated captures of images and repeated positionings of rolling diffuser #2 to sequential coded patterns. The captured images are images of the distorted reflections of these patterns, as reflected by the surface of the object.

In step S1005, the polarizer and/or analyzer are repositioned so as to vary the angle of polarization, the positionings and captures of step S1004 are repeated. As mentioned above, in embodiments which do not separate the diffuse component of reflection from the specular component of reflection, step S1005, with its repositioning of the polarizer and the analyzer, and its repetition of pattern positionings and image captures, may be omitted.

In step S1006, rolling diffuser #1 is positioned to expose its first coded pattern region and all other rolling diffusers are positioned to expose their transparent regions.

In step S1007, there are repeated captures of images and repeated positionings of rolling diffuser #1 to sequential coded patterns. The captured images are images of the distorted reflections of these patterns, as reflected by the surface of the object.

In step S1008, the polarizer and/or analyzer are repositioned so as to vary the angle of polarization, the positionings and captures of step S1007 are repeated. As mentioned above, and like step S1005, in embodiments which do not separate the diffuse component of reflection from the specular component of reflection, step S1008, with its repositioning of the polarizer and the analyzer, and its repetition of pattern positionings and image captures, may be omitted.

In step S1009, for embodiments which do separate the diffuse component of reflection from the specular component of reflection, the diffuse and specular components are separated.

In step S1010, diffuse regions of the object are reconstructed using diffuse components of reflection. This step may be omitted for embodiments that reconstruct specular objects not containing significant diffuse regions.

In step S1011, for embodiments that do differentiate between light paths having direct single reflections and light paths having indirect multi-reflections, light paths having a direct single reflection are determined based on intersection with the visual hull extracted in step S1002. For embodiments that do not differentiate between light paths having direct single reflections and light paths having indirect multi-reflections, step S1011 may be omitted.

In step S1012, the surface shape of specular regions of the object is reconstructed using the captured images. For embodiments that do differentiate between light paths having direct single reflections and light paths having indirect multi-reflections, light paths having indirect multi-reflections are exclude, and only light paths having a direct single reflection, as determined in step S1011, are used.

Figure 11A:
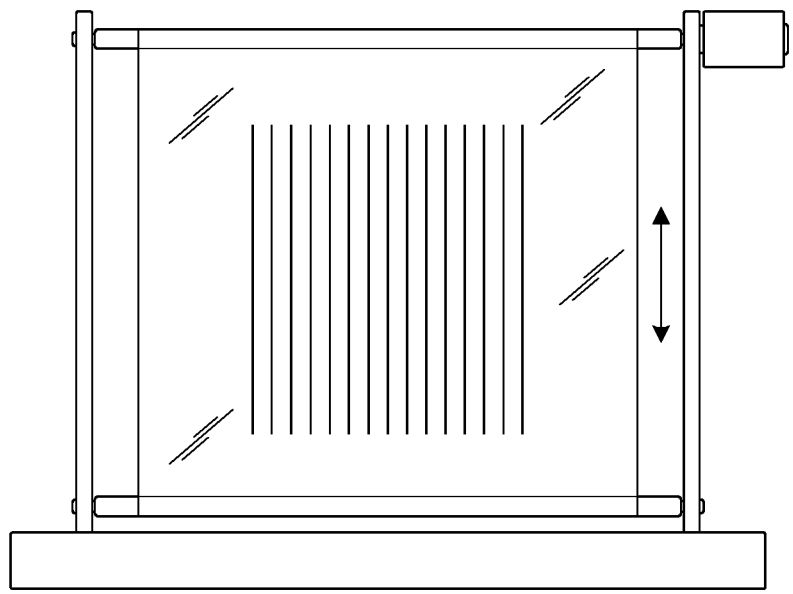
FIGS. 11A and 11B are views depicting movable sheets that are transparent.
Figure 11B:
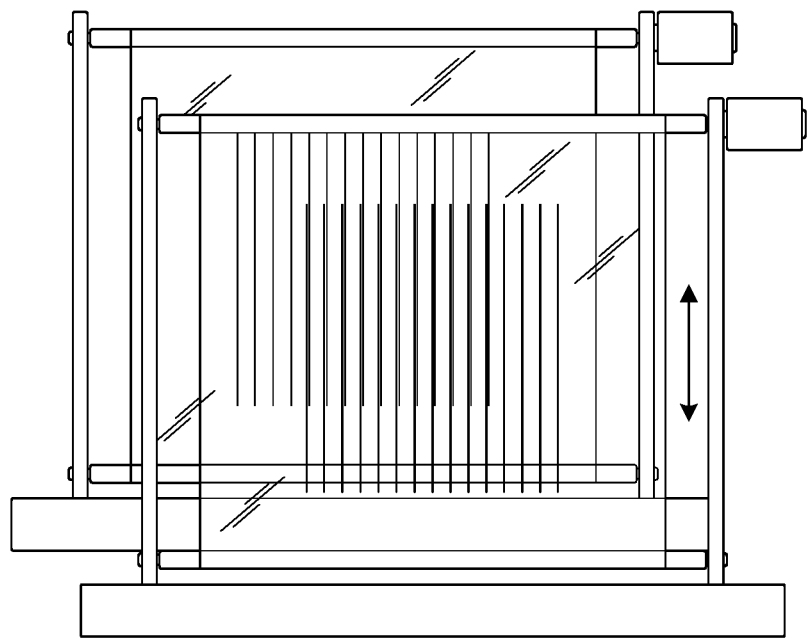

In the foregoing embodiments, the movable sheets may be transparent and they may be opaque or translucent, in which case the transparent regions may be formed by windows removed from the sheets. FIGS. 11A and 11B are views depicting movable sheets that are transparent.

Computer Implementation

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

What is claimed is:

1. An apparatus for shape reconstruction of the surface of an object positioned at an inspection station, the apparatus comprising:

first and second movable sheets positioned in spaced-apart relation relative to each other, each of the first and second sheets being movable to expose at least one transparent region and at least one pattern region to the inspection station, wherein the pattern region of each is configured to bear a coded pattern thereon;

a projector positioned to project coded patterns onto the pattern regions, wherein the pattern regions of the first and second movable sheets are translucent;

an image capture device positioned and configured to capture images in a direction toward the inspection station; and a controller configured to control movement of the first and second sheets so as to expose the inspection station to coded patterns, and configured to reconstruct the shape of the surface of an object positioned at the inspection station by calculations using images captured by the image capture device, wherein in a first phase the controller moves the first sheet to the pattern region and the second sheet to the transparent region, and controls the projector to project a first sequence of patterned light onto the pattern region of the first sheet, wherein in a second phase the controller moves the first sheet to the transparent region and the second sheet to the pattern region, and controls the projector to project a second sequence of patterned light onto the pattern region of the second sheet, and wherein based on the captured images, the controller reconstructs the shape of the surface of an object having at least some specular characteristics.

2. The apparatus according to claim 1, further comprising separation of diffuse components from specular components in the captured images, and wherein the shape of the surface of the object is reconstructed using the specular components.

3. The apparatus according to claim 1, further comprising:
extracting a visual hull of the object; and
separating between light paths having direct single reflections and light paths having indirect multi-reflections in the images of the reflected patterns, by calculations using the visual hull,
wherein the shape of the surface of the object is reconstructed using the light paths having direct single reflections.

4. A method for shape reconstruction of the surface of an object positioned at an inspection station, the method comprising:
moving first and second movable sheets, each having at least one transparent region and at least one pattern region, and each positioned in spaced-apart relation relative to each other, the first and second movable sheets each being moved so as to expose the transparent region and the pattern region to the inspection station;
projecting a coded pattern on the pattern regions, wherein the pattern regions of the first and second movable sheets are translucent;
capturing images in a direction toward the inspection station; and
reconstructing the shape of the surface of an object positioned at the inspection station by calculations using the captured images,
wherein in a first phase the first sheet is moved to the pattern region and the second sheet is moved to the transparent region, and a first sequence of patterned light is projected onto the pattern region of the first sheet,
wherein in a second phase the first sheet is moved to the transparent region and the second sheet is moved to the pattern region, and a second sequence of patterned light is projected onto the pattern region of the second sheet, and
wherein based on the captured images, the shape of the surface of an object having at least some specular characteristics is reconstructed.

5. The method according to claim 4, further comprising separation of diffuse components from specular components in the captured images, and wherein the shape of the surface of the object is reconstructed using the specular components.

6. The method according to claim 4, further comprising:
extracting a visual hull of the object; and
separating between light paths having direct single reflections and light paths having indirect multi-reflections in the images of the reflected patterns, by calculations using the visual hull,
wherein the shape of the surface of the object is reconstructed using the light paths having direct single reflections.

7. An apparatus for shape reconstruction of the surface of an object positioned at an inspection station, the apparatus comprising:
a processor for executing computer-executable process steps; and
a memory that stores computer-executable process steps that cause the processor to execute the method for shape reconstruction of the surface of an object positioned at an inspection station according to claim 4.

* * * * *